(12) United States Patent
Ikeda et al.

(10) Patent No.: US 7,958,054 B2
(45) Date of Patent: Jun. 7, 2011

(54) APPARATUS FOR REPRODUCTION SONG DATA WITH LIMITATION DEPENDENT ON PREVIEW OR PURCHASE

(75) Inventors: Takashi Ikeda, Hamamatsu (JP); Satoshi Hiratsuka, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 10/765,332

(22) Filed: Jan. 26, 2004

(65) Prior Publication Data

US 2004/0154459 A1 Aug. 12, 2004

(30) Foreign Application Priority Data

Jan. 28, 2003 (JP) ................................. 2003-019306

(51) Int. Cl.
*G06F 21/00* (2006.01)
*G06Q 30/00* (2006.01)

(52) U.S. Cl. ................ 705/51; 705/57; 705/52; 369/83; 369/84

(58) Field of Classification Search .................... 705/51, 705/1, 57; 369/83, 84
See application file for complete search history.

(56) References Cited

U.S. PATENT DOCUMENTS

| | | | | |
|---|---|---|---|---|
| 5,794,217 A | * | 8/1998 | Allen | 705/27 |
| 5,809,144 A | * | 9/1998 | Sirbu et al. | 705/53 |
| 5,857,021 A | * | 1/1999 | Kataoka et al. | 705/54 |
| 5,889,860 A | * | 3/1999 | Eller et al. | 705/51 |
| 5,892,900 A | * | 4/1999 | Ginter et al. | 726/26 |
| 5,900,564 A | * | 5/1999 | Kurakake | 84/477 R |
| 5,910,987 A | * | 6/1999 | Ginter et al. | 705/52 |
| 5,915,019 A | * | 6/1999 | Ginter et al. | 705/54 |
| 5,917,912 A | * | 6/1999 | Ginter et al. | 713/187 |
| 6,005,939 A | * | 12/1999 | Fortenberry et al. | 705/76 |
| 6,061,448 A | * | 5/2000 | Smith et al. | 380/282 |
| 6,112,181 A | * | 8/2000 | Shear et al. | 705/10 |
| 6,138,119 A | * | 10/2000 | Hall et al. | 1/1 |
| 6,157,721 A | * | 12/2000 | Shear et al. | 380/255 |
| 6,185,683 B1 | * | 2/2001 | Ginter et al. | 713/176 |
| 6,189,098 B1 | * | 2/2001 | Kaliski, Jr. | 713/168 |

(Continued)

FOREIGN PATENT DOCUMENTS

EP 1 284 481 2/2003

(Continued)

OTHER PUBLICATIONS

Chinese Office Action No. 2003101240343 and its full English translation.

(Continued)

*Primary Examiner* — Evens J Augustin
(74) *Attorney, Agent, or Firm* — Morrison & Foerster LLP

(57) ABSTRACT

A song data reproduction apparatus has a storage for song data composed of performance data and order information. The performance data represents a content of a music performance and contains reproduction limiting information for limiting a reproduction state of the music performance. The order information indicates either of a purchase or a preview associated to a usage right of the content of the music performance. A usage right identification section refers to the order information of the song data containing the performance data to be reproduced, for identifying the usage right of the content of the music performance in terms of the purchase or preview. A limiting information read section reads the reproduction limiting information from the performance data when the identified usage right indicates the preview. A reproduction control section controls the reproduction state of the music performance in accordance with the read reproduction limiting information.

19 Claims, 6 Drawing Sheets

U.S. PATENT DOCUMENTS

| | | | |
|---|---|---|---|
| 6,226,618 B1 * | 5/2001 | Downs et al. | 705/1 |
| 6,236,971 B1 * | 5/2001 | Stefik et al. | 705/54 |
| 6,237,786 B1 * | 5/2001 | Ginter et al. | 213/153 |
| 6,240,185 B1 * | 5/2001 | Van Wie et al. | 380/232 |
| 6,253,193 B1 * | 6/2001 | Ginter et al. | 705/57 |
| 6,385,596 B1 * | 5/2002 | Wiser et al. | 705/51 |
| 6,452,609 B1 * | 9/2002 | Katinsky et al. | 715/716 |
| 6,772,335 B2 * | 8/2004 | Curtis et al. | 713/163 |
| 2001/0049641 A1 | 12/2001 | Nakamura et al. | |
| 2002/0103759 A1 | 8/2002 | Matsumoto et al. | |
| 2003/0110132 A1 | 6/2003 | Sako | |

FOREIGN PATENT DOCUMENTS

| | | |
|---|---|---|
| JP | 2001-325460 A | 11/2001 |
| JP | 2002-140077 | 5/2002 |
| JP | 2002-366442 | 12/2002 |
| JP | 2003-3009230 | 1/2003 |
| WO | WO-01/65796 A2 | 9/2001 |
| WO | WO-01/65796 A3 | 9/2001 |
| WO | WO-02/065449 A1 | 8/2002 |

OTHER PUBLICATIONS

European Patent Office Communication Pursuant to Article 94(3) EPC mailed Dec. 2, 2009, seven pages.

European Search Report mailed May 28, 2009, for EP Application No. 04100185.0, three pages.

European Examination Report mailed Jul. 26, 2010, for EP Application No. 04100185.0, seven pages.

* cited by examiner

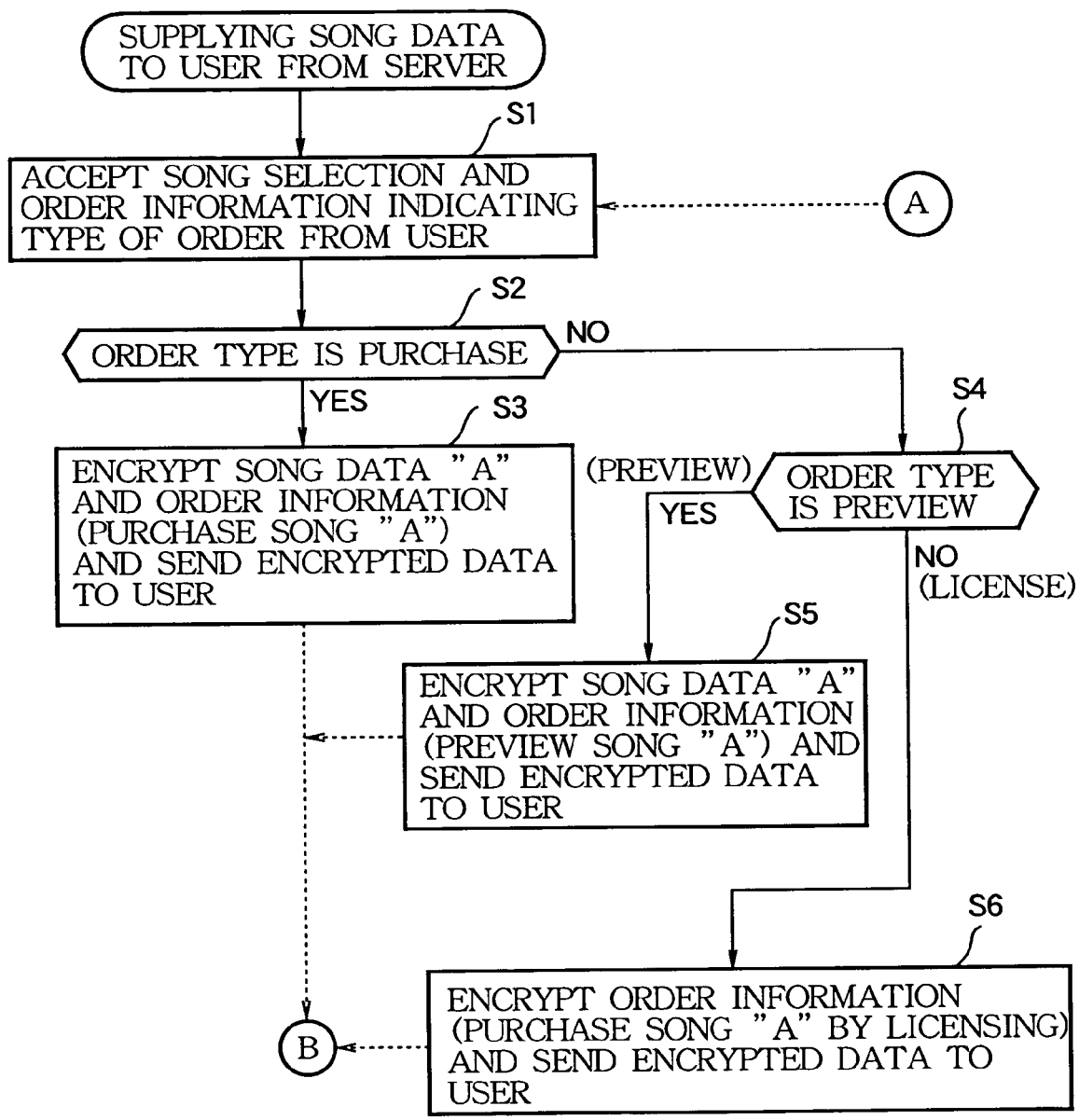
FIG.3 (1)

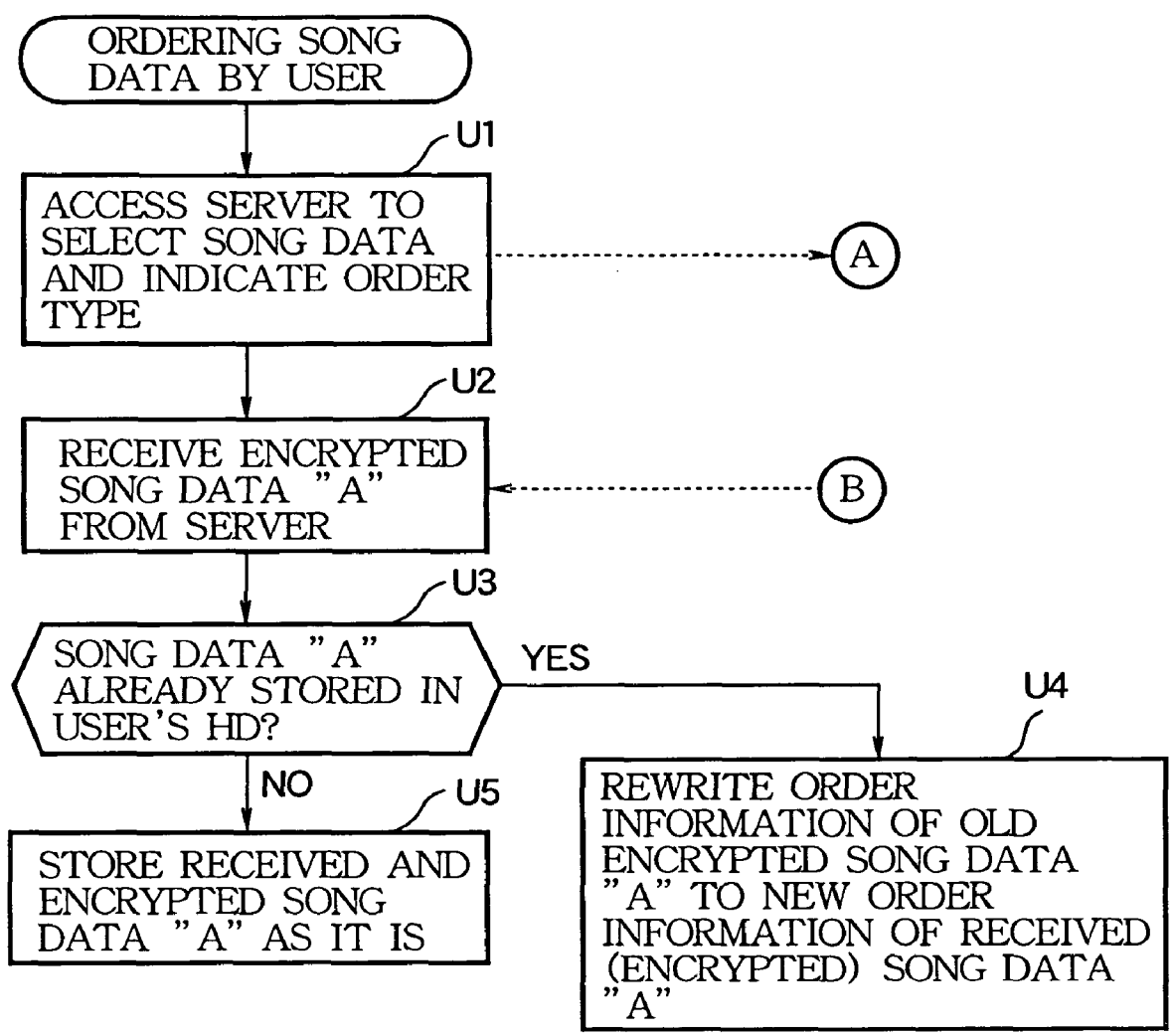

APPARATUS FOR REPRODUCTION SONG DATA WITH LIMITATION DEPENDENT ON PREVIEW OR PURCHASE

BACKGROUND OF THE INVENTION

1. Technical Field of the Invention

The present invention relates to a song data reproduction system capable of changing reproduction modes of song data in accordance with the song data privilege corresponding to trial or purchase of the song data.

2. Prior Art

As disclosed in patent document 1, for example, there is known a conventional system for obtaining song data from the Internet by initially downloading preview data and subsequently purchasing registered data. In this case, for example, the preview data has limitations in such a manner that its reproduction time is shorter than the registered data.

Patent document 1 is Japanese Patent Unexamined Publication No. 2001-350479.

According to such prior art, however, a supplier of the song data must prepare both preview data and registered data. Further, when a user orders preview data, and then orders registered data, the preview data remains unnecessarily at the user side.

SUMMARY OF THE INVENTION

The present invention has been made in consideration of the foregoing. It is therefore an object of the present invention to provide a song data reproduction system using performance data including reproduction limiting information and song data containing order information for enabling reproduction of the performance data in an appropriate mode dependent on the usage right (contents of the license) indicated by the order information, thereby eliminating double use of the preview version and purchase version.

In a first category of the invention, a song data reproduction apparatus comprises a storage section that stores song data composed of performance data and order information, the performance data representing a content of a music performance and containing reproduction limiting information for limiting a reproduction state of the music performance, the order information indicating at least either of a purchase or a preview associated to a usage right of the content of the music performance, a usage right identification section that refers to the order information of the song data containing the performance data to be reproduced, for identifying the usage right of the content of the music performance in terms of the purchase or preview, a limiting information read section that reads the reproduction limiting information from the performance data when the identified usage right indicates the preview, and a reproduction control section that controls the reproduction state of the music performance in accordance with the read reproduction limiting information.

Specifically, the reproduction limiting information contains information for limiting a reproduction time of the music performance, so that the reproduction control section limits the reproduction time of the music performance in accordance with the read reproduction limiting information. Further, the reproduction limiting information contains information for specifying a channel among a plurality of channels usable for reproducing the music performance, so that the reproduction control section uses only the specified channel for reproducing the music performance in accordance with the read reproduction limiting information. Moreover, the reproduction limiting information contains information for specifying functions among various functions available in reproducing of the music performance, so that the reproduction control section enables only the specified functions for reproducing the music performance in accordance with the read reproduction limiting information.

In a second category of the invention, a song data reproduction program is designed for use in a song data reproduction apparatus having a processor and a storage for storing song data composed of performance data and order information, the performance data representing a content of a music performance and containing reproduction limiting information for limiting a reproduction state of the music performance, the order information indicating at least either of a purchase or a preview associated to a usage right of the content of the music performance. The inventive program is executable by the processor for causing the song data reproduction apparatus to carry out a process comprising a usage right identification step of referring to the order information in the song data containing the performance data to be reproduced, for identifying the usage right of the content of the music performance in terms of the purchase or preview, a limiting information read step of reading the reproduction limiting information from the performance data when the identified usage right indicates the preview, and a reproduction control step of controlling the reproduction state of the music performance in accordance with the read reproduction limiting information.

Specifically, the reproduction limiting information contains information for limiting a reproduction time of the music performance, so that the reproduction control step limits the reproduction time of the music performance in accordance with the read reproduction limiting information. Further, the reproduction limiting information contains information for specifying a channel among a plurality of channels usable for reproducing the music performance, so that the reproduction control step uses only the specified channel for reproducing the music performance in accordance with the read reproduction limiting information. Moreover, the reproduction limiting information contains information for specifying functions among various functions available in the song data reproduction apparatus, so that the reproduction control step enables only the specified functions for reproducing the music performance in accordance with the read reproduction limiting information.

In a third category of the invention, a song data recording medium is provided for recording song data composed of performance data and order information, the performance data representing a content of a music performance and containing reproduction limiting information for limiting a reproduction state of the music performance, the order information indicating at least either of a purchase or a preview associated to a usage right of the content of the music performance. The inventive medium is machine-readable and operative when the medium is set into a song data reproduction apparatus for causing the song data reproduction apparatus to carry out a sequence of referring to the order information in the song data containing the performance data to be reproduced, for identifying the usage right of the content of the music performance in terms of the purchase or preview, reading the reproduction limiting information from the performance data when the identified usage right indicates the preview, and controlling the reproduction state of the music performance in accordance with the read reproduction limiting information.

Specifically, the reproduction limiting information contains information for limiting a reproduction time of the music performance, whereby the song data reproduction apparatus limits the reproduction time of the music performance in accordance with the read reproduction limiting information. Further, the reproduction limiting information contains information for specifying a channel among a plurality of channels usable for reproducing the music performance, whereby the song data reproduction apparatus uses only the specified channel for reproducing the music performance in accordance with the read reproduction limiting information. Moreover, the reproduction limiting information contains information for specifying functions among various functions available by the song data reproduction apparatus, whereby the song data reproduction apparatus enables only the specified functions for reproducing the music performance in accordance with the read reproduction limiting information.

In a fourth category of the invention, a server apparatus is connectable to a user terminal through a communication network. The inventive server apparatus comprises a receiving section that receives an order for requesting a review of a song from the user terminal through the communication network, and a transmitting section that transmits data of the song to the user terminal through the communication network. The data of the song comprises performance data and order information, the performance data representing a content of a music performance of the song and containing reproduction limiting information for limiting a reproduction state of the music performance, the order information indicating that a usage right of the content of the music performance is limited to the preview, thereby enabling the user terminal to recognize from the order information that the usage right of the content of the music performance is limited to the preview, and enabling the user terminal to control the reproduction state of the music performance in accordance with the reproduction limiting information.

Preferably, the receiving section receives another order for requesting a license of the song to remove limitation of the reproduction of the music performance, and the transmitting section transmits an updated order information indicating that the usage right of the content of the music performance is a purchase of the song, thereby enabling the user terminal to recognize from the updated order information that the usage right of the content of the music performance is switched to the purchase, and enabling the user terminal to reproduce the music performance without any limitation under the license. Specifically, the reproduction limiting information contains at least one of information for limiting a reproduction time of the music performance, information for limiting a plurality of channels usable for reproducing the music performance, and information for limiting various functions available for reproducing the music performance.

BRIEF DESCRIPTION OF THE DRAWINGS

FIGS. 3(1) and 3(2) are a flowchart showing operation of a server apparatus involved in the song data reproduction system according to the embodiment of the present invention.

DETAILED DESCRIPTION OF THE INVENTION

Figure 1:
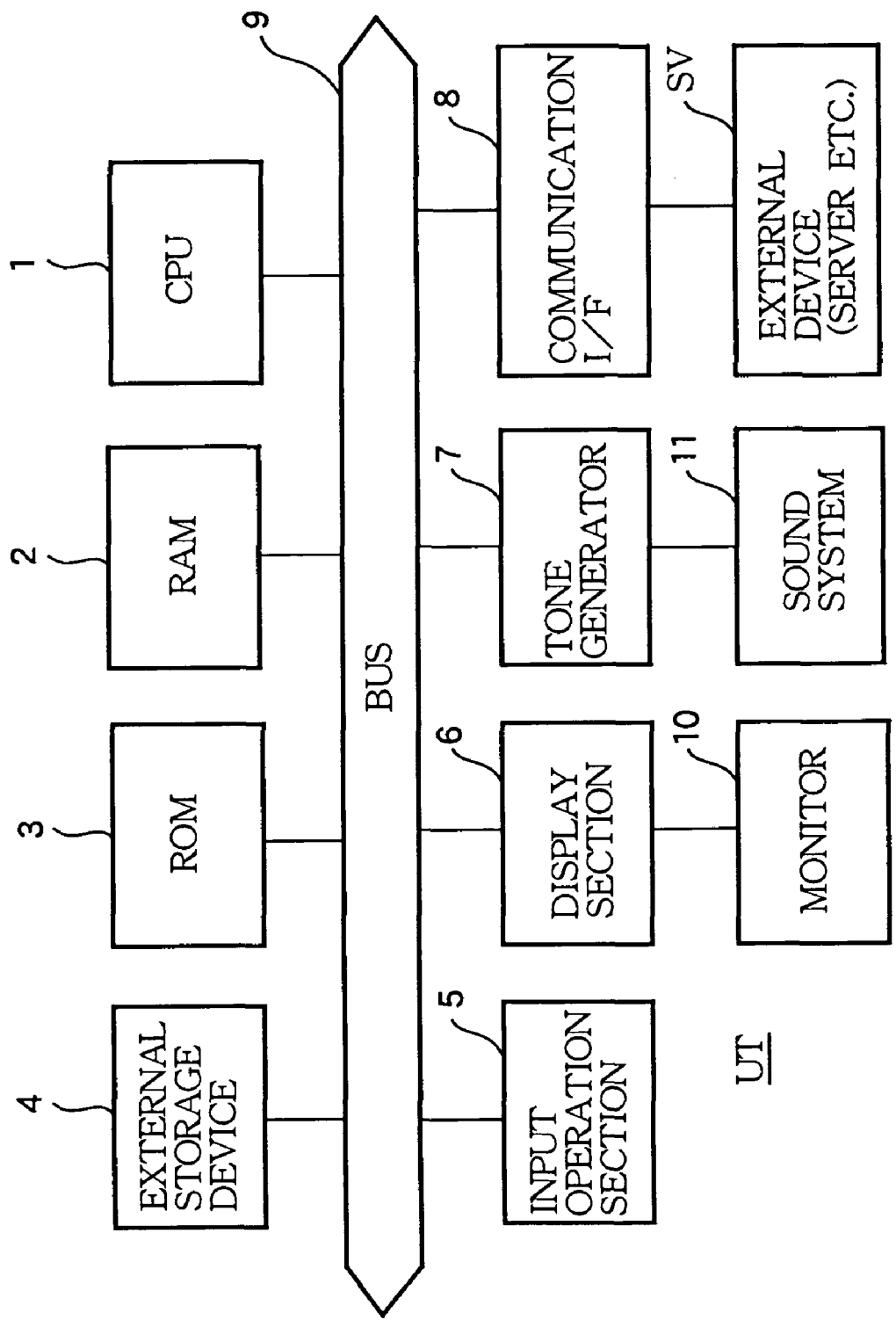
FIG. 1 is a block diagram showing a hardware configuration of song data reproduction apparatus (user terminal) according to an embodiment of the present invention.

First, there is given an overall view of the invention in conjunction with the attached drawings. According to a major feature of the present invention, there is provided a song data reproduction apparatus (UT) comprising a storage section (4) for storing song data comprising performance data and order information, wherein the performance data records a performance content and reproduction limiting information (LE) for limiting a reproduction state of the performance data. The order information indicates a usage right of the performance data. A usage right identification section (U13, U14) is provided for referencing the order information of the song data to be reproduced and identifying a usage right of corresponding performance data. A limiting information read section (U15) is provided for reading reproduction limiting information (LE) in the performance data when the identified usage right indicates a preview version. A reproduction control section (U16 through U18, U22 through U28) is provided for controlling reproduction of the performance data in accordance with the read reproduction limiting information (LE).

Further, there is provided a song data reproduction program to execute a procedure on a song data reproduction apparatus (UT) having a storage section (4) for storing song data comprising performance data and order information, wherein performance data records a performance content and reproduction limiting information (LE) for limiting a reproduction state of the performance data. The order information indicates a usage right of the performance data. The procedure comprises a usage right identification step (U13, U14) to reference order information about song data to be reproduced and identify a usage right of corresponding performance data, a limiting information read step (U15) to read reproduction limiting information (LE) in the performance data when the identified usage right indicates a preview version; and a reproduction control step (U16 through U18, U22 through U28) to control reproduction of the performance data in accordance with the read reproduction limiting information (LE).

Moreover, there is provided a song data recording medium (4) to record song data comprising performance data and order information, wherein the performance data stores reproduction limiting information (LE) to limit a reproduction state, and wherein the order information indicates at least either of a purchase or a preview associated to a usage right of the content of the music performance. The medium is machine-readable and operative when the medium is set into a song data reproduction apparatus for causing the song data reproduction apparatus to carry out a sequence of referring to the order information in the song data containing the performance data to be reproduced, for identifying the usage right of the content of the music performance in terms of the purchase or preview, reading the reproduction limiting information from the performance data when the identified usage right indicates the preview, and controlling the reproduction state of the music performance in accordance with the read reproduction limiting information.

The song data reproduction apparatus (UT) and the song data reproduction program according to the present invention can be configured so that the reproduction limiting information (LE) contains information (L2) for limiting a reproduction time of the performance data, hence the reproduction control section and step limits the reproduction time according to the read reproduction limiting information. The reproduction limiting information (LE) may contain information (L1) for limiting a reproduction channel, hence the reproduction control section limits the reproduction channel according to the read reproduction limiting information. The reproduction limiting information (LE) can be configured to contain function limiting information (L3) to limit a reproduction function. The reproduction control section and steps (U16 through U18, U22 through U28) can be configured to enable only a function specified by the function limiting information contained in the read reproduction limiting information. Likewise, the reproduction limiting information in a song data recording medium (4) according to the present invention can be configured to contain information (L2) to limit a reproduction time, to contain information (L1) to limit a reproduction channel, and to contain information (L3) to limit a reproduction function.

The song data reproduction system according to the present invention uses song data comprising a pack of performance data and order information. The performance data of the song data stores reproduction limiting information (LE) containing at least information (L2) for limiting a reproduction time. For example, the reproduction limiting information (LE) is stored as an event indicating a limit on the number of reproduction bars. The order information indicates a usage right of the performance data. For example, the order information indicates "preview version" (trial version) or "purchase version" (licensed version) depending on ranks of ordering the song data.

When reproducing song data, the song data reproduction apparatus (UT) reads the song data from the storage section (4). The apparatus first references the order information to identify the usage right of the performance data (music performance content) packed in the song data. When the order information indicates the usage right to be "preview version", the apparatus accordingly reads the reproduction limiting information (LE) stored in the performance data (U15). The apparatus controls reproduction of the performance data (U16 through U18, U22 through U28) in accordance with the read reproduction limiting information (LE).

When the song data is found to be "preview version" during reproduction, for example, the apparatus reads the reproduction bar count limitation event (LE, L2) in the performance data to perform limitative reproduction within a limited time. When the song data is found to be "purchase version", the apparatus ignores the reproduction bar count limitation event (LE, L2) in the performance data to perform full reproduction independently of the limited time. It is preferable to encrypt the song data for only an authorized user of the song data reproduction apparatus to be able to use the song data free from alteration.

The reproduction limiting information (LE) contains not only the reproduction time limiting information (L2), but also the channel limiting information (L1) to limit reproduction channels and the function limiting information (L3) to limit reproduction apparatus functions such as displaying scores and lyrics, guiding the performance, and the like. During reproduction of "preview version", the more limitative reproduction is performed (U25, U26) by enabling only the reproduction channel and the function corresponding to the channel limiting information (L1) and the function limiting information (L3) contained in the read reproduction limiting information (LE).

As mentioned above, according to the present invention, the reproduction limiting information (LE) is included in the performance data that represents a music performance content of the song data. In addition, the song data is provided with the order information indicating the usage right to be "preview version" or "purchase version" as information to determine whether or not to activate or effectuate the reproduction limiting information (LE) for reproduction of the performance data. The song data reproduction apparatus (UT) references the usage right of the order information to control the reproduction mode of the performance data. It just needs to provide the single performance data itself as the music performance content. Therefore, the performance data can be reproduced in an appropriate mode compliant with the usage right (content of license) indicated by the order information without repurchasing the entire song data.

For example, a user may first obtain song data of "preview version", and then purchase the song data or a license of "purchase version". The song data of "preview version" contains the order information indicating that the performance data is "preview version". The song data of "purchase version" contains the order information indicating that the performance data is "purchase version". The license of "purchase version" corresponds to the order information indicating only "purchase version". In such case, it just needs to change the usage right status of the order information attached to the song data from "preview version" to "purchase version". The unnecessary song data of "preview version" does not remain at the user side.

Hereafter, embodiments of the present invention will be described in further detail with reference to the accompanying drawings. The embodiments are mere examples. The present invention may be embodied in various modifications without departing from the spirit and scope of the invention.

[System Configuration]

FIG. 1 shows a hardware configuration example of a song data reproduction apparatus according to an embodiment of the present invention. In this example, a song data reproduction apparatus UT represents an electronic musical apparatus such as a sequencer having the communication function and the musical sound generation function. The song data reproduction apparatus UT comprises a central processing unit (CPU) 1, random access memory (RAM) 2, read-only memory (ROM) 3, an external storage device 4, an input operation section 5, a display section 6, a tone generator 7, and a communication interface (communication I/F) 8. These components 1 through 8 are connected to each other via a bus 9.

The CPU 1 to control the entire apparatus executes various processes including the song data reproduction in accordance with a specified control program. The RAM 2 functions as a processing buffer to temporarily store various types of information used for these processes and is provided with an event register EVENT, for example. The ROM 3 stores not only various control programs including a song data reproduction program to allow the CPU 1 to execute song data reproduction, but also various data, tables, and the like.

The external storage device 4 is a storage section using storage media such as a hard disk (HD), compact disk read-only memory (CD-ROM), flexible disk (FD), magneto-optic disk (MO), digital versatile disk (DVD), memory card, and the like. Various control program such as the song data reproduction program and data can be stored in not only the ROM 3, but al the external storage device 4.

If the ROM 3 stores no control program, for example, it is possible to store a control program in the external storage device 4 such as HD and CD-ROM and then load the control program into the RAM 2. In this manner, the CPU 1 can perform the same operation as for the case where the ROM 3 stores the control program. This makes addition or upgrade of the control program easy. For example, it is possible to implement an intended song data reproduction apparatus by installing song data reproduction programs and song data used for the song data reproduction.

The input operation section 5 comprises an input operation device and an input detection circuit. When the input operation device such as a mouse or a keyboard supplies the contents of setup or control operations, the input detection circuit detects and incorporates the contents into the system. The input operation device has operation devices such as various keys and switches and is used to set system operation states or input various types of information needed for song data reproduction. The display section 6 connects with a monitor (such as CRT, LCD, etc.) and controls the display contents or turn-on/off states of various indicators (lamps) of the display according to instructions from the CPU 1. The display section 6 provides visual assistance to operations of the input operation section 5.

The tone generator 7 contains a tone generator (including software) and an effect provision DSP and generates a musical sound signal corresponding to performance data reproduced by the CPU 1. The tone generator 7 connects with a sound system 11 having a D/A converter, an amplifier, and a speaker. The sound system 11 generates a musical sound based on the musical sound signal from the tone generator 7. That is to say, the tone generator 7 and the sound system 11 form a musical sound generation section and generates musical sounds based on the reproduced performance data.

The communication I/F 8 is an interface connected to a local area network (LAN), the Internet, general communication networks such as telephone lines, and a MIDI network for communication with the other MIDI devices. The communication I/F 8 can obtain various control programs and data from an external device SV such as a server or other MIDI devices via each network and exchange various types of necessary information with the external device SV. If the reproduction apparatus UT stores no control programs or various data as mentioned above, for example, the control programs or data can be downloaded from a server computer SV and the like via the communication network.

In FIG. 1, the server is explained as one of external devices SVs and has the same internal configuration as that shown in FIG. 1. The server is denoted by the reference symbol SV hereafter. The server can provide information about song data such as the song data reproduction program and song data for a plurality of song data reproduction apparatuses UTs (hereafter sometimes referred to as "user terminals") that are configured as mentioned above. The server SV stores a large amount of various information about the song data in a song database configured on a hard disk (HD) of the external storage device. In this manner, the server SV can distribute information requested by each user terminal UT.

[Song Data]

Figure 2:
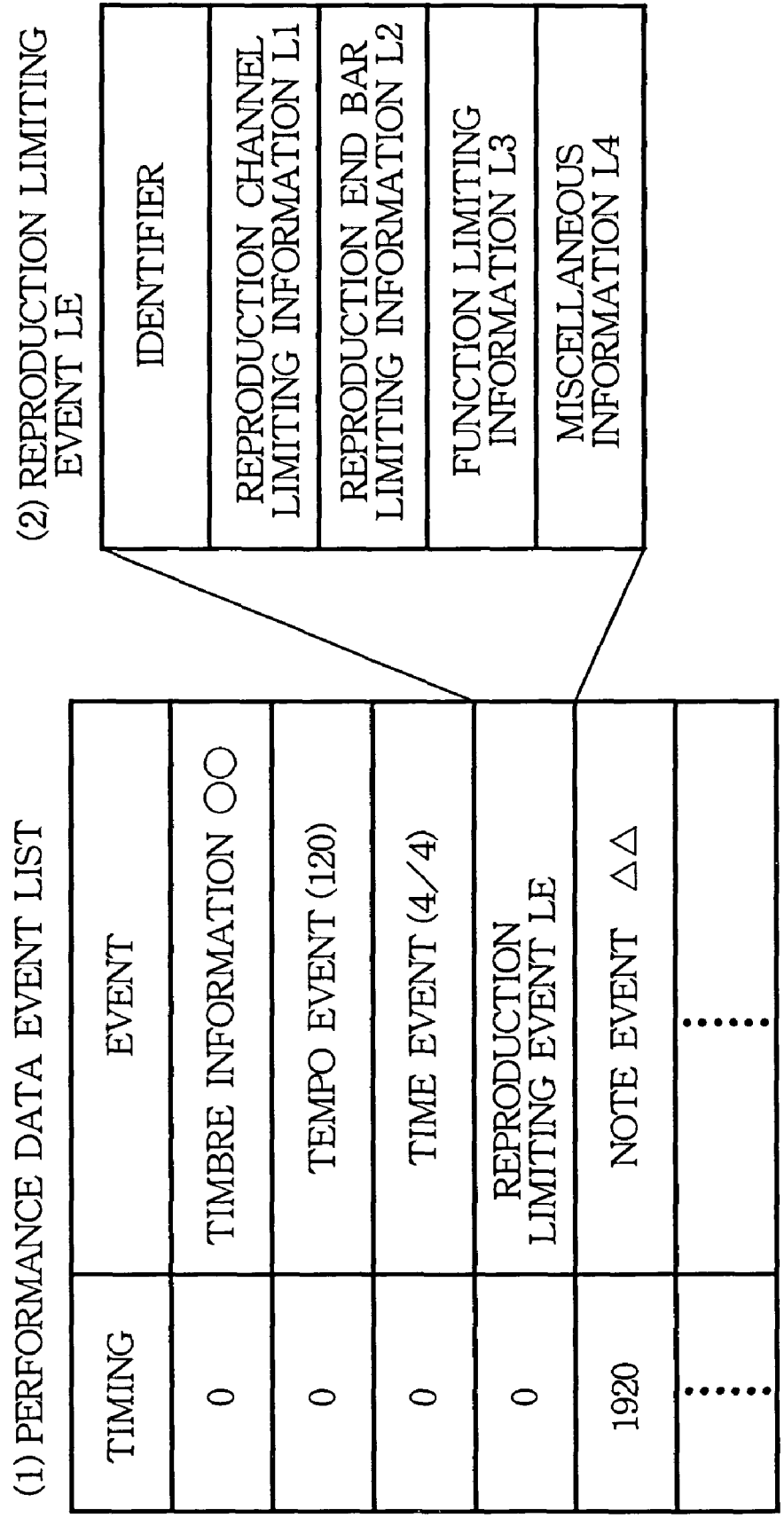
FIG. 2 shows a configuration example of performance data used in a song data reproduction system according to the embodiment of the present invention.

The song data processed by the song data reproduction apparatus (user terminal) UT is a packed form of performance data and order information. The performance data represents the contents of a song. The order information specifies the usage right of the performance data. The performance data cannot be reproduced without the order information. FIG. 2 shows a configuration example of performance data used in the song data reproduction system according to the embodiment of the present invention. FIG. 2(1) exemplifies performance data in the form of an event list that contains various events (right column) to be generated or set and the corresponding timing data (left column). Timing data numerically represents the timing in units of ticks, for example.

According to the example of FIG. 2(1), the performance event for timing data "0" contains control events such as timbre information "○○", tempo event "120", time event "4/4", and the like as conventionally practiced. That is to say, the control events represent the performance conditions such as the timbre, the tempo, and the time. The performance conditions are followed by sequential performance events such as note event "ΔΔ" for timing data "1920" and so on and control reproduction modes of these individual performance events. When a new similar control event appears later, the performance condition according to this control event controls the subsequent reproduction mode of the performance events. The performance events include not only musical sound events such as the above-mentioned note event for musical sound generation, but also the other various performance events used for displaying musical scores or lyrics, guiding the performance, and the like.

According to the embodiment of the present invention, a reproduction limiting event LE is added to timing data "0" in the performance data. The reproduction limiting event LE is automatically read only when the usage right in the order information indicates a "preview version" (also referred to as a trial version). The reproduction limiting event LE is ignored for a "purchase version" (also referred to as a licensed version). As shown in FIG. 2(2), the reproduction limiting event LE comprises an identifier and a plurality of pieces of limiting information L1, L2, and so on. The identifier represents that the event is a reproduction limiting event. The limiting information controls the reproduction mode of performance events when the corresponding reproduction limiting event LE is read.

The pieces of limiting information comprise, for example, reproduction channel limiting information L1 to specify a reproduction channel, reproduction end bar limiting information L2 to specify a reproduction end bar, and function limiting information L3 to specify the other reproduction functions attached to the musical sound reproduction, and the like. For example, the reproduction channel limiting information L1 is used to limit reproduction channels of the performance data to only a specified one such as 1ch. The reproduction end bar limiting information L2 is used to limit the reproduction time up to a specified reproduction end bar such as up to the end of the 20th bar. The function limiting information L3 is used to limit the other reproduction functions combined with the musical sound reproduction such as displaying musical scores or lyrics, guiding the performance, and the like to the specified contents. Miscellaneous information L4 is additional limiting information used as needed to limit the timbre or the tempo to a specified one.

The order information is added to song data to represent the usage right of the song data. For example, the order information indicates whether the song data is "preview version" or "purchase version". The order information permits the use (reproduction) of performance data contained in the song data. The order information also functions as control information to determine whether or not to use the reproduction limiting information (LE) during reproduction of the performance data. If the song data does not contain the order information, the performance data cannot be reproduced. When the order information indicates "preview version", the performance data is reproduced in accordance with the limiting conditions (L1 through L4) indicated by the reproduction limiting information (LE) in the performance data. It should be noted that this reproduction mode is referred to as "limitative reproduction" or "preview reproduction". When the order information indicates "purchase version", the performance data is reproduced independently of the reproduction limiting information (LE). It should be noted that this reproduction mode is referred to as "full reproduction".

As a general rule, the order information cannot be obtained independently. However, there may be a case where the song data reproduction apparatus (user terminal) UT is already provided with song data such as "preview version" song data comprising the performance data and the "preview version" order information. In such case, it is possible to obtain the order information of the song data by rewriting that order information.

[Purchasing Song Data]

A user terminal (song data reproduction apparatus) UT can download song data containing the performance data and the order information from the server SV via the communication network. Alternatively, song data can be recorded on a recording medium such as CD-ROM or FD. After the recording medium is installed on a user terminal UT, the user notifies the server SV that he or she is provided with the song data. In this manner, the song data can be used on the user terminal UT. The server SV uses a song database (HD) to store a large amount of information about song data and can provide necessary information in response to a request from the user terminal UT. The song database (HD) also records situations of providing each user terminal UT with various information about song data.

FIG. 3 shows an example of purchasing information about song data from a server in the song data reproduction system according to the embodiment of the present invention. FIG. (1) is a flowchart for the server SV that supplies song data to the user terminal UT. FIG. 3(2) is a flowchart for the user terminal UT that purchases song data correspondingly from the server SV.

With reference to FIG. 3, the following summarizes functions of the song data reproduction system according to the embodiment of the present invention. The song data reproduction system uses song data that is available from the server SV and the like (S3, S5, S6 to U2). The song data is a packed form of the performance data ("song A") containing the performance itself and the reproduction limiting information (LE) and the order information indicative of a rank ("song A purchased" or "song A previewed"). The usage right status of the order information is settled to either the purchase version (song A purchased) or the preview version (song A previewed) depending on the order types such as "purchase", "preview", and "license". The reproduction limiting information (LE) contains the various limiting information L1 through L4 for controlling the reproduction channels, reproduction times, and reproduction functions such as displaying scores and lyrics, guiding the performance, and the like. When the order information indicates "preview version", the song data reproduction apparatus (user terminal) UT limitatively reproduces (or previews) the performance data (song A) according to the limitations of the reproduction limiting information (LE). When the order information indicates "purchase version", the song data reproduction apparatus (user terminal) UT fully reproduces the performance data (song A) independently of the reproduction limiting information (LE).

The following describes specifics. When a user of the user terminal UT intends to purchase song data from the server SV, the user terminal UT first accesses the server SV (step U1). A monitor 10 of the user terminal UT displays a song data guidance screen presenting song data services the server SV can provide. Using this screen, the user can select an intended song name and the order type of the song data.

This example provides the order types "purchase", "preview", and "license". When the user already obtains the performance data of the selected song in the form of "preview version", the "license" indicates the order type for using the performance data as "purchase version". When the user selects the intended song name (e.g., song A) and the order type (purchase, preview, or license), the user terminal UT sends song selection information and purchase instruction information to the server SV (step U1). The song selection information specifies the song name (song A). The purchase instruction information specifies the order type.

At step S1, the server SV accepts the song selection information (song A) and the purchase instruction information (purchase, preview, or license). At steps S2 and S3, the server SV then determines the order type for the song data from the accepted purchase instruction information. When the user specifies the order type "purchase" (YES at S2), the server SV accesses the song database (HD) to retrieve the performance data indicating performance contents of the song data corresponding to the song name (song A) specified in the song selection information. The server SV then forms a pack (set) of the order information and the performance data (song A) to create song data "A". Here, the order information indicates that the usage right of the performance data (song A) is "purchase version". The server encrypts the song data "A" using, e.g., identification information unique to the user terminal UT, and then sends the encrypted song data "A" to the user terminal UT (step 3).

When the user specifies the order type "preview" (NO at S2 and YES at S4), the server SV forms a set of the performance data and the order information. Here, the performance data indicates the performance contents of "song A" specified by the user. The order information indicates that the usage right of the performance data (song A) is "preview version". Likewise, the server SV encrypts song data "A" as the set and sends it to the user terminal UT.

When the user specifies the order type "license" (NO at S4), the server SV packs the performance data for the user-specified "song A" and the order information indicating the usage right to be "purchase version" to create song data "A". The server SV likewise encrypts song data "A" and sends it to the user terminal UT (step S6). Namely, in the server SV, the receiving section receives an order for requesting a license of the song to remove limitation of the reproduction of the music performance. In return, the transmitting section transmits an updated order information indicating that the usage right of the content of the music performance is a purchase of the song, thereby enabling the user terminal to recognize from the updated order information that the usage right of the content of the music performance is switched to the purchase, and enabling the user terminal to reproduce the music performance without any limitation under the license.

The user terminal UT receives the encrypted song data "A" from the server SV (step U2). In accordance with the user's specification, the song data "A" is encrypted as: the song A's performance data and the "purchase version" information (S3); the song A's performance data and the "preview version" information (S5); or the song A's "purchase version" information only (S6). It is determined whether or not a storage section 4 (HD) of the user terminal UT already stores the performance data corresponding to the song data "A" (step U3).

When the user terminal UT (HD) already records the song data including the relevant performance data, the order information for the song data is replaced by the order information for the song data "A" received from the server SV to indicate "purchase version" or "preview version". The user terminal UT notifies this change to the server SV (step U4). As mentioned above, for example, the identification information unique to the user terminal UT is used to encrypt the performance data (song data) already recorded in the user terminal UT (HD) and the newly recorded order information about song data "A". Rewriting the order information may change the usage right of the performance data on the user terminal UT from "preview" to "purchase". In such case, the subsequent "reproduction" operation enables the full reproduction independent of the limitations from the reproduction limiting event LE.

When the user terminal UT (HD) does not record the song data including the relevant performance data, song data "A" received from the server SV is recorded as is in the storage section 4 (HD) of the user terminal UT. The user terminal UT notifies this operation to the server SV (step U5). Also in this case, song data "A" is likewise encrypted to be received and recorded in the user terminal UT.

[Reproducing Song Data]

Figure 4:
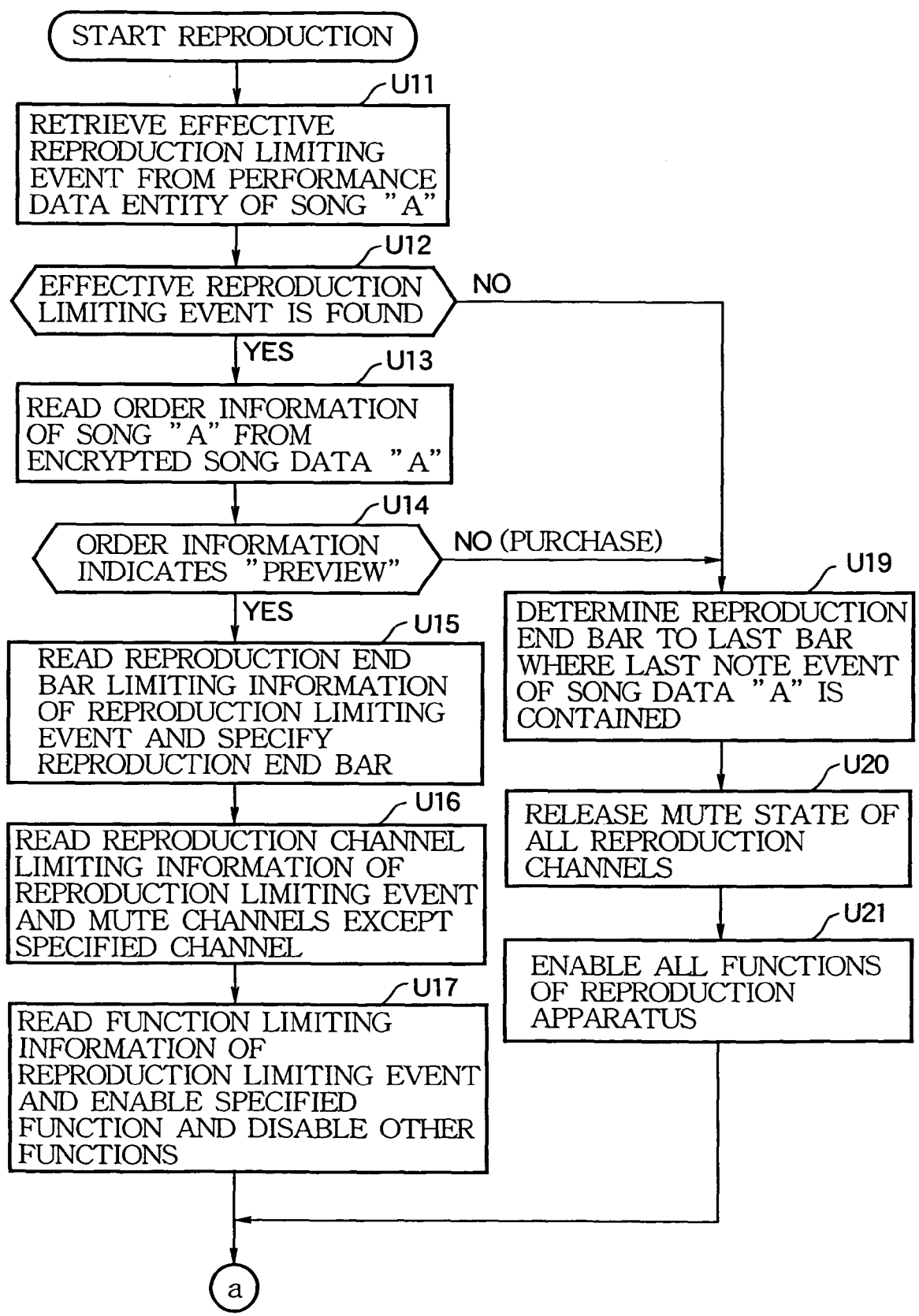
FIG. 4 is one part of a flowchart exemplifying song data reproduction operation in the song data reproduction apparatus (user terminal) according to the embodiment of the present invention.
Figure 5:
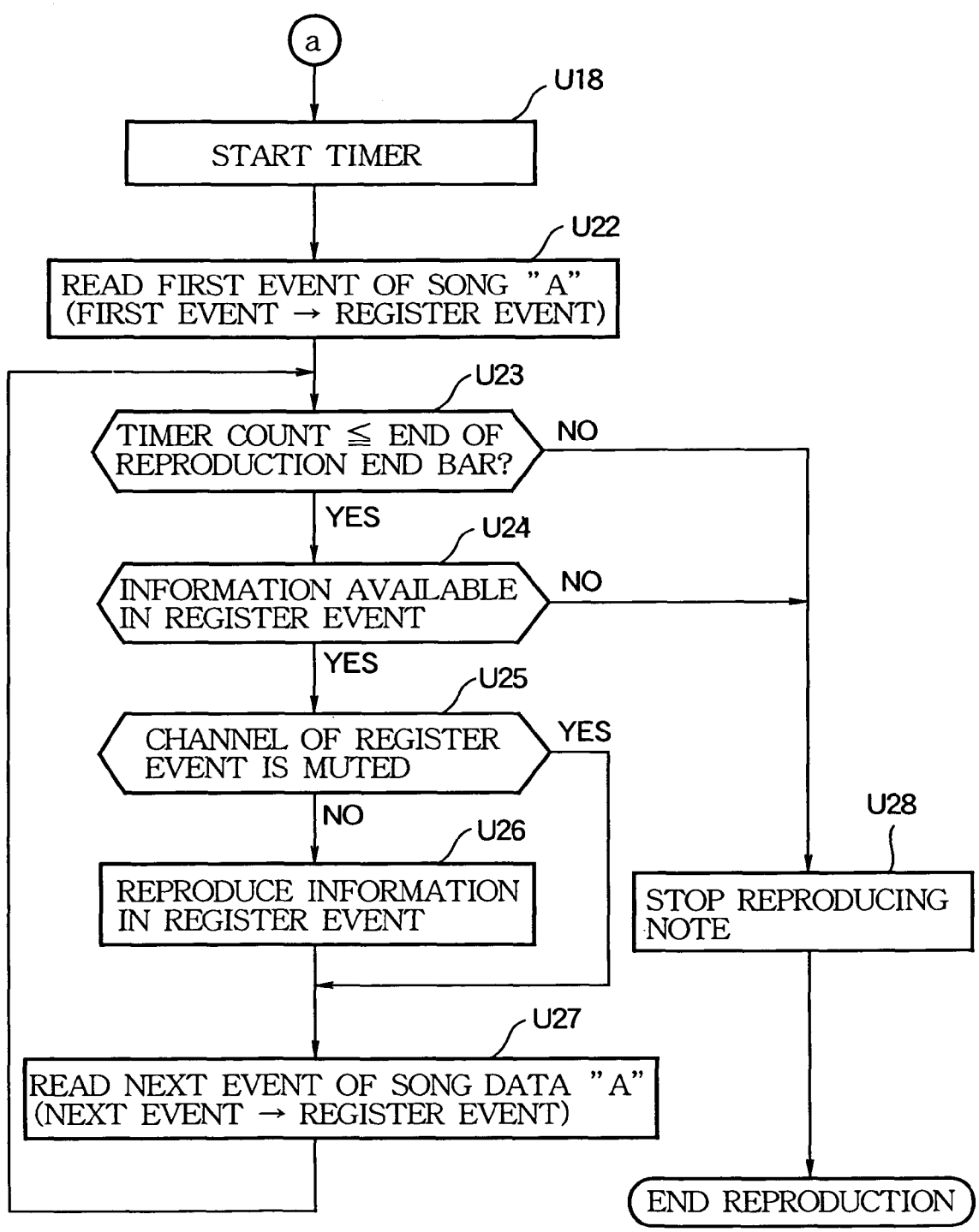
FIG. 5 is another part of the flowchart exemplifying the song data reproduction operation in the song data reproduction apparatus (user terminal) according to the embodiment of the present invention.

When song data received from the server SV contains the order information indicating "trial version", the song data reproduction apparatus according to the embodiment of the present invention is subject to limitations on modes of reproducing the performance data according to the reproduction limiting event LE contained in the performance data of the song data. FIGS. 4 and 5 show flowcharts exemplifying operations during the song data reproduction in the song data reproduction apparatus according to the embodiment of the present invention.

For example, a user operates a given operation device (5) on the song data reproduction apparatus, i.e., the user terminal UT to start reproducing the song data "A". The CPU 1 first retrieves an effective reproduction limiting event LE from the performance data (see FIG. 2), i.e., actual data representing the performance contents of the song data "A" (step U11). The song data "A" is recorded and encrypted in accordance with the song data recording processes (U4 and U5) to be the set of the performance data and the order information (purchase version or preview version) both for the song data "A". When there is a plurality of reproduction limiting events LEs for the same song data, the effective reproduction limiting event LE is selected from effective events on a first-come-first-served basis, for example. After the retrieval (U11), it is determined whether or not an effective reproduction limiting event LE is available (step U12).

When an effective reproduction limiting event LE is found (YES at U12), the CPU 1 reads the order information about the song "A" from the encrypted song data "A" (step U13). The CPU 1 further decrypts the order information to determine whether or not the song data "A" in the user terminal UT is specified to be "preview version" (step U14).

When the order information indicates "preview" (YES at U14), the CPU 1 reads the reproduction end bar limiting information L2 specified by the reproduction limiting event LE and defines it to be a reproduction end bar (step U15). The reproduction end bar hereafter is represented with symbol "Be". The CPU 1 then reads the reproduction channel limiting information L1 for the reproduction limiting event LE and mutes channels other than those matching the reproduction channel limiting information L1 (step U16). The CPU 1 further reads the function limiting information L3 for the reproduction limiting event LE to enable or disable the function of displaying scores or lyrics. The CPU 1 then enables a function corresponding to the function limiting information L3 and disables the other functions (step U17). Upon completion of settings for the limitative reproduction based on the limitations of the reproduction limiting event LE, the timer starts (step U18).

When no effective reproduction limiting event LE is available (NO at U12) or when the order information indicates "purchase" instead of "preview" (NO at U14), the CPU 1 assigns reproduction end bar Be to a bar where the last event for song data "A" ends (step U19). The CPU 1 releases all the muted reproduction channels (step U20) and enables all the reproduction functions of the reproduction apparatus UT (step U21). After completion of settings for the full reproduction in this manner, the timer starts (U18). When no effective reproduction limiting event LE is available (NO at U12), it may be preferable to assume the performance data to be faulty. Instead of performing the above-mentioned steps U19 through U21, for example, it may be preferable to issue an alert message, and then immediately terminate the reproduction operation.

After starting the timer (U18), the CPU 1 sequentially reads events that are recorded for the performance data of the song data "A" in the order of timings. The CPU 1 first reads the first one performance event and stores it as event information in the event register EVENT of the RAM 2 (step U22).

At step U23, the CPU 1 performs reproduction time determination to determine whether or not a time indicated by the timer precedes the end of reproduction end bar Be (see steps U15 and U19). The time indicated by the timer is hereafter referred to as the "current time" appended by symbol "Tn". The end of reproduction end bar Be is hereafter referred to as the "reproduction end time" appended by symbol "Te". When current time Tn≦reproduction end time Te (YES at U23), the CPU 1 checks whether or not the event register EVENT contains event information (step U24). When the event information is available (YES at U24), the CPU 1 further checks whether or not the reproduction channel corresponding to the event information is muted (step U25).

When the reproduction channel is not muted (NO at U25), the CPU 1 performs a process to reproduce the event information in the event register EVENT (step U26). The event information reproduction is not limited to simply sending the event information to the tone generator 7 to generate a corresponding musical sound signal. The event information reproduction also includes supplying the event information to execution sections of the other enabled reproduction functions (U17 and U21) and executing the other corresponding reproduction functions, and the like.

After the event information in the event register EVENT is processed (U26) or when the reproduction channel is muted (YES at U25), the CPU 1 reads the next one performance event for the performance data of the song data "A" and stores it as event information in the event register EVENT (step U27). Then, returning to the reproduction time determination step (U23), the CPU 1 repeats the above-mentioned steps U25 through U27 while the condition of current time Tn≦reproduction end time Te takes effect (YES at U23) and the relevant event information is available (YES at U24).

There may be a case where current time Tn becomes greater than reproduction end time Te to exceed it (NO at U23). There may be another case where the event register EVENT contains no event information even if the condition of current time Tn≦reproduction end time Te takes effect (YES at U23). That is to say, there is no new substantial event to be read from the performance data, and the event register EVENT contains the end data or blank data (NO at U24). In any of these cases, the CPU 1 stops reproducing a note, if any, being reproduced (step U28), and then terminates the reproduction operation.

[Various Modes]

While there has been described one embodiment of the present invention, it can be embodied in various modes. For example, the embodiment uses the song data comprising the performance data and the order information. Further, the song data may comprise the performance data embedded with the order information. A MIDI file can be used for the performance data in the song data. A meta event can be used for the reproduction limiting event LE that indicates a reproduction bar count limitation. Moreover, it may be preferable to use files and events having formats that comply with the specifications of the reproduction apparatus UT.

According to the embodiment, the reproduction limiting event LE indicating the reproduction bar count limitation is positioned at timing "0" (beginning) of the performance data. For example, the reproduction limiting event LE may be positioned otherwise, e.g., at the end of the performance data. Basically, there is assumed one reproduction limiting event LE indicating the reproduction bar count limitation. When there is a plurality of reproduction limiting events LE, it may be preferable to select one of them automatically or according to a user's setting on a first-come-first-served or last-come-first-served basis. Furthermore, when there is a plurality of reproduction limiting events LE, it may be preferable to reference information attached outside the performance data and to enable one piece of information that matches the condition. For example, a preview version may be provided with a plurality of usage right levels to change the number of bars subject to reproduction limitations at each level.

The reproduction limiting bar count (L2) is effective for the reproduction limiting event LE. As shown in FIG. 2(2), however, the reproduction limiting event LE may further include not only the reproduction channel limiting information (L1) and the function limiting information (L3), but also the miscellaneous information (L4).

According to the embodiment, a user purchases and reproduces one piece of song data. It may be preferable to purchase or reproduce a plurality of song data. In this case, the order information is attached outside the performance data to indicate the purchase version or the preview version. For example, the order information can be formed to be a song-based list to mix a purchase version song and a preview version song.

According to the embodiment, song data is used on a user terminal in the form of "reproduction". As mentioned above, the "reproduction" includes not only generating a sound (musical sound), but also displaying scores and lyrics and guiding (training) the performance. The song data may be purchased not only online from the Internet, but also by physically exchanging data using FDs and CDs, for example.

As mentioned above, according to the present invention, the reproduction limiting information is included in the performance data that indicates a performance content of the song data. In addition, the song data is provided with the order information indicating the usage right to be "preview version" or "purchase version" as information to determine whether or not to accept the reproduction limiting information for reproduction of the performance data. The song data reproduction apparatus references the usage right of the order information to control the reproduction mode of the performance data. It just needs to provide the single performance data itself as the performance content. Therefore, the performance data can be reproduced in an appropriate mode compliant with the usage right indicated by the order information without repurchasing the entire song data. For example, the user may first obtain song data of "preview version", and then purchase the song data or a license of "purchase version". In such case, it just needs to change the usage right status of the order information attached to the song data from "preview version" to "purchase version". The song data of "preview version" can be reused at the user side.

What is claimed is:

1. A song data reproduction apparatus comprising:
a transmitting section that sends an order for requesting a purchase or a preview of a content of a music performance to a server;
a receiving section that downloads song data from the server in response to the order, the song data being composed of performance data and order information corresponding to the performance data, the performance data representing the content of the music performance and containing reproduction limiting information for limiting a reproduction state of the content of the music performance, and the order information indicating at least either a purchase or a preview associated with a usage right of the content of the music performance;
a storage section;
a determining section that determines whether the song data has already been stored in the storage section;
a writing section that rewrites the order information contained in the stored song data with the order information contained in the received song data when the determining section determines that the song data has already been stored and that writes the received song data into the storage section when the determining section determines that the song data is not stored in the storage section;
a usage right identification section that refers to the order information of the song data containing the performance data to be reproduced, for identifying the usage right of the content of the music performance in terms of the purchase or the preview;
a limiting information read section that reads the reproduction limiting information from the performance data when the identified usage right indicates the preview, and does not read the reproduction limiting information from the performance data when the identified usage right indicates the purchase; and
a reproduction control section that specifies a portion of the performance data according to the read reproduction limiting information when the identified usage right indicates the preview, then reproduces only the specified portion of the performance data, and does not reproduce other portions of the content of the performance data than the specified portion, the reproduction control section reproducing all of the performance data when the identified usage right indicates the purchase, wherein the reproduction control section reproduces all of the performance data without reading the reproduction limiting information when the writing section rewrites the order information indicating the preview to the order information indicating the purchase.

2. The song data reproduction apparatus according to claim 1, wherein the reproduction limiting information contains information for limiting a reproduction time of the music performance, so that the reproduction control section limits the reproduction time of the music performance in accordance with the read reproduction limiting information.

3. The song data reproduction apparatus according to claim 1, wherein the reproduction limiting information contains information for specifying a channel among a plurality of channels usable for reproducing the music performance, so that the reproduction control section uses only the specified channel for reproducing the music performance in accordance with the read reproduction limiting information.

4. A song data reproduction method executable by a song data reproduction apparatus having a processor and a storage, the method comprising the steps of:

sending an order for requesting a purchase or a preview of a content of a music performance to a server;

downloading song data from the server in response to the order, the song data being composed of performance data and order information corresponding to the performance data, the performance data representing the content of the music performance and containing reproduction limiting information for limiting a reproduction state of the content of the music performance, the order information indicating at least either a purchase or a preview associated with a usage right of the content of the music performance;

determining whether the song data has already been stored in the storage;

rewriting the order information contained in the stored song data with the order information contained in the received song data when the step of determining determines that the song data has already been stored and writing the received song data into the storage when the step of determining determines that the song data is not stored in the storage;

referring to the order information in the song data containing the performance data to be reproduced, for identifying the usage right of the content of the music performance in terms of the purchase or the preview;

reading the reproduction limiting information from the performance data when the identified usage right indicates the preview and not reading the reproduction limiting information from the performance data when the identified usage right indicates the purchase;

specifying a portion of the performance data according to the read reproduction limiting information when the identified usage right indicates the preview;

reproducing only the specified portion of the performance data and not reproducing other portions of the content of the performance data than the specified portion; and reproducing all of the performance data when the identified usage right indicates the purchase wherein the step of reproducing reproduces all of the performance data without reading the reproduction limiting information when the step of rewriting rewrites the order information indicating the preview to the order information indicating the purchase.

5. The method according to claim 4, wherein the reproduction limiting information contains information for limiting a reproduction time of the music performance, so that the step of reproducing only the specified portion of the performance data limits the reproduction time of the music performance in accordance with the read reproduction limiting information.

6. The method according to claim 4, wherein the reproduction limiting information contains information for specifying a channel among a plurality of channels usable for reproducing the music performance, so that the step of reproducing only the specified portion of the performance data uses only the specified channel for reproducing the music performance in accordance with the read reproduction limiting information.

7. A song data recording medium, wherein the medium is readable by a computer for causing the computer to perform the steps comprising:

sending an order for requesting a purchase or a preview of a content of a music performance to a server;

downloading song data from the server in response to the order, the song data being composed of performance data and order information corresponding to the performance data, the performance data representing the content of the music performance and containing reproduction limiting information for limiting a reproduction state of the content of the music performance, the order information indicating at least either a purchase or a preview associated with a usage right of the content of the music performance;

determining whether the song data has already been stored in the medium;

rewriting the order information contained in the stored song data with the order information contained in the received song data when the step of determining determines that the song data has already been stored and writing the received song data into the medium when the step of determining determines that the song data is not stored in the medium;

referring to the order information in the song data containing the performance data to be reproduced, for identifying the usage right of the content of the music performance in terms of the purchase or the preview;

reading the reproduction limiting information from the performance data when the identified usage right indicates the preview and not reading the reproduction limiting information from the performance data when the identified usage right indicates the purchase;

specifying a portion of the performance data according to the read reproduction limiting information when the identified usage right indicates the preview;

reproducing only the specified portion of the performance data and not reproducing other portions of the content of the performance data than the specified portion; and reproducing all of the performance data when the identified usage right indicates the purchase wherein the step of reproducing reproduces all of the performance data without reading the reproduction limiting information when the step of rewriting rewrites the order information indicating the preview to the order information indicating the purchase.

8. The song data recording medium according to claim 7, wherein the reproduction limiting information contains information for limiting a reproduction time of the music performance, whereby the computer limits the reproduction time of the music performance in accordance with the read reproduction limiting information.

9. The song data recording medium according to claim 7, wherein the reproduction limiting information contains information for specifying a channel among a plurality of channels usable for reproducing the music performance, whereby the computer uses only the specified channel for reproducing the music performance in accordance with the read reproduction limiting information.

10. A server apparatus connectable to a song data reproduction apparatus through a communication network, comprising:

a receiving section that downloads an order for requesting a preview or a purchase of a song from the song data reproduction apparatus through the communication network; and a creating section that operates when the received order requests the preview for creating data of the song, said data composed of performance data representing a content of a music performance of the song and containing reproduction limiting information for limiting a reproduction state of the content of the music performance, and order information indicating that a usage right of the content of the music performance is limited to the preview, the reproduction limiting information specifying a portion of the content not to be reproduced, said creating section operates when the received order requests the purchase for creating data of the song, said data composed of performance data representing the content of the music performance of the song, and order information indicating that a usage right of the content of the music performance is not limited, wherein the same performance data is commonly used for both the data of the song containing the order information indicating the preview and the data of the song containing the order information indicating the purchase; and a transmitting section that transmits the data of the song to the song data reproduction apparatus through the communication network, thereby enabling the song data reproduction apparatus to recognize the order information so that the song data reproduction apparatus specifies a portion of the content of the music performance in accordance with the reproduction limiting information when the recognized usage right indicates the preview, then reproduces only the specified portion of the performance data, and does not reproduce other portions of the content of the performance data than the specified portion, and that the song data reproduction apparatus does not read the reproduction limiting information and reproduces all of the performance data when the recognized usage right indicates the purchase, wherein the song data reproduction apparatus has a storage, and receives the data of the song from the server apparatus, determines whether the data of the song has been already stored in the storage, rewrites the order information contained in the stored data of the song to the order information contained in the received data of the song when the data of the song has already been stored, and writes the received data of the song into the storage when the data of the song is not stored in the storage, wherein the song data reproduction apparatus reproduces all of the performance data without reading the reproduction limiting information when the order information indicating the preview is rewritten to the order information indicating the purchase.

11. The server apparatus according to claim 10, wherein the reproduction limiting information contains at least one of information for limiting a reproduction time of the music performance, information for limiting a plurality of channels usable for reproducing the music performance, and information for limiting various functions available for reproducing the music performance.

12. The song data reproduction apparatus according to claim 1, wherein the storage section stores order information indicating a level of the preview associated to one or more levels of the usage right, and stores the reproduction limiting information specifying one or more conditions of limiting the reproduction state of the content of the music performance in correspondence to one or more levels of the preview;

the limiting information read section reads one of the conditions of limiting the reproduction state specified by the reproduction limiting information from the performance data in correspondence to the level of the preview indicated by the order information; and the reproduction control section controls the reproduction state of the content of the music performance in accordance with the read condition specified by the reproduction limiting information.

13. The method according to claim 4, wherein
storing in the storage order information indicating a level of the preview associated to one or more levels of the usage right, and stores the reproduction limiting information specifying one or more conditions of limiting the reproduction state of the content of the music performance in correspondence to one or more levels of the preview;

said step of reading comprises reading one of the conditions of limiting the reproduction state specified by the reproduction limiting information from the performance data in correspondence to the level of the preview indicated by the order information; and said step of reproducing only the specified portion of the performance data comprises controlling the reproduction state of the content of the music performance in accordance with the read condition specified by the reproduction limiting information.

14. The medium according to claim 7, wherein
the medium stores order information indicating a level of the preview associated to one or more levels of the usage right and stores the reproduction limiting information specifying one or more conditions of limiting the reproduction state of the content of the music performance in correspondence to one or more levels of the preview; and wherein said step of reading comprises reading one of the conditions of limiting the reproduction state specified by the reproduction limiting information from the performance data in correspondence to the level of the preview indicated by the order information; and said step of reproducing only the specified portion of the performance data comprises controlling the reproduction state of the content of the music performance in accordance with the read condition specified by the reproduction limiting information.

15. A song data reproduction apparatus comprising:

a transmitting section that sends an order for requesting a purchase or a preview of a content of a music performance to a server;

a receiving section that downloads song data from the server in response to the order, the song data being composed of performance data and order information corresponding to the performance data, the performance data representing the content of the music performance and containing reproduction limiting information for limiting a reproduction state of the content of the music performance, the order information indicating at least either a purchase or a preview associated with a usage right of the content of the music performance;

a storage section;

a determining section that determines whether the song data has already been stored in the storage section;

a writing section that rewrites the order information contained in the stored song data with the order information contained in the received song data when the determining section determines that the song data has already been stored and that writes the received song data into the storage section when the determining section determines that the song data is not stored in the storage section;

a usage right identification section that refers to the order information of the song data containing the performance data to be reproduced, for identifying the usage right of the content of the music performance in terms of the purchase or the preview;

a limiting information read section that reads the reproduction limiting information from the performance data when the identified usage right indicates the preview, and does not read the reproduction limiting information from the performance data when the identified usage right indicates the purchase; and a reproduction control section that specifies one or more of a plurality of reproduction functions according to the read reproduction limiting information when the identified usage right indicates the preview, then enables only the specified reproduction functions for reproducing the performance data and disables other reproduction functions than the specified reproduction function, the reproduction control section enabling all of the reproduction functions for reproducing the performance data when the identified usage right indicates the purchase wherein the reproduction control section enables all of the reproduction functions without reading the reproduction limiting information when the writing section rewrites the order information indicating the preview to the order information indicating the purchase.

16. The song data reproduction apparatus according to claim 1, wherein the performance data contains a series of event data, which includes at least a musical sound event for generating a musical sound of the musical performance and a reproduction limiting event representing the reproduction limiting information.

17. The song data reproduction method according to claim 4, wherein the performance data contains a series of event data, which includes at least a musical sound event for generating a musical sound of the musical performance and a reproduction limiting event representing the reproduction limiting information.

18. The song data recording medium according to claim 7, wherein the performance data contains a series of event data, which includes at least a musical sound event for generating a musical sound of the musical performance and a reproduction limiting event representing the reproduction limiting information.

19. The song data reproduction apparatus according to claim 15, wherein the performance data contains a series of event data, which includes at least a musical sound event for generating a musical sound of the musical performance and a reproduction limiting event representing the reproduction limiting information.

* * * * *